R. H. GARMAN.
BOOK AND THE LIKE FOR CHILDREN.
APPLICATION FILED FEB. 13, 1918.
1,273,763.
Patented July 23, 1918.
2 SHEETS—SHEET 1.
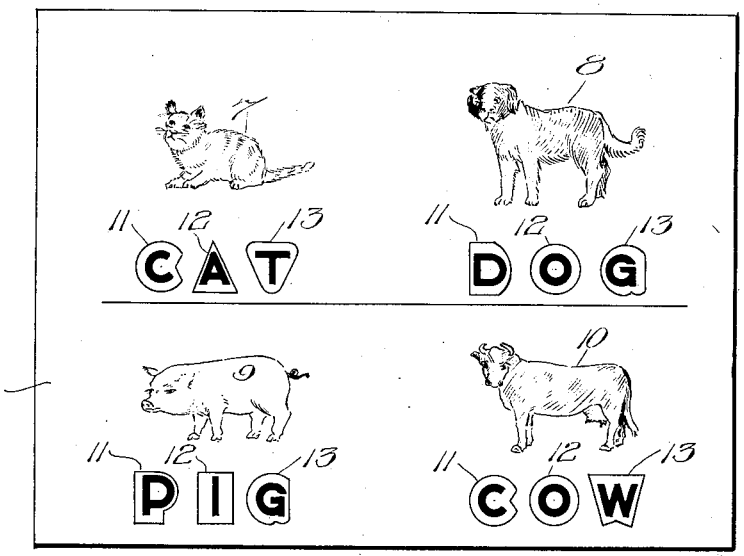
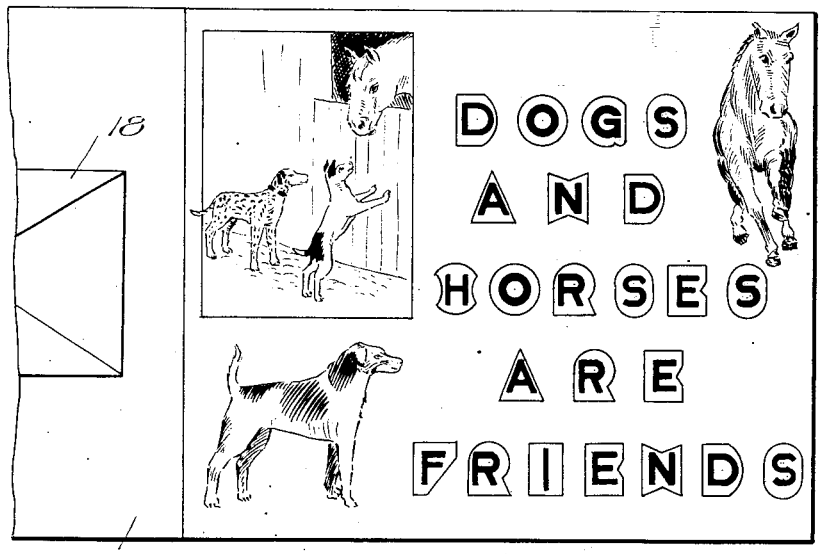
Witness:
Harry S. Gaither
Inventor:
Raymond H. Garman
by Bunny & Bunny
Attys

R. H. GARMAN.
BOOK AND THE LIKE FOR CHILDREN.
APPLICATION FILED FEB. 13, 1918.

1,273,763.

Patented July 23, 1918.

$$1^{14} + 1^{15} + 2^{16} = 4^{17} \qquad 3 - 1 = 2$$

$$1 + 2 + 3 = 6 \qquad 5 - 2 = 3$$

$$10 \div 2 = 5 \qquad 2 \times 2 = 4$$

$$21 \div 3 = 7 \qquad 3 \times 2 = 6$$

Witness:
Harry J. Gaither

Inventor:
Raymond H. Garman
by _____ Attys

UNITED STATES PATENT OFFICE.

RAYMOND H. GARMAN, OF WILMETTE, ILLINOIS.

BOOK AND THE LIKE FOR CHILDREN.

1,273,763.  Specification of Letters Patent.  Patented July 23, 1918.

Application filed February 13, 1918. Serial No. 216,950.

*To all whom it may concern:*

Be it known that I, RAYMOND H. GARMAN, a citizen of the United States, residing at Wilmette, county of Cook, and State of Illinois, have invented certain new and useful Improvements in Books and the like for Children, of which the following is a specification.

The present invention has to do with certain improvements in the construction of books or outfits and the like for the amusement and instruction of children. The features of the invention can be incorporated either in a book comprising a plurality of leaves, or in single leaves disconnected from each other, or in or on any surface of suitable material.

The features of the invention and the construction and arrangement of the article itself are such that the child is given instruction or training of a rudimentary nature either in spelling, reading or arithmetic, while at the same time affording the child amusement and pleasure.

The invention briefly stated may be said to consist in the provision of a sheet or leaf or a suitable surface carrying one or more characters or illustrations, in conjunction with which there are provided perforations, recesses, or specially shaped markings into or onto which specially cut cards or blocks may be inserted or placed. These cards or blocks carry characters or legends such that when they are set into their respective and proper locations, they will provide a word or phrase having particular reference to the characters or legends on the sheet, or will provide the answer to the arithmetical problem presented, or will complete a picture.

Other objects and uses of the invention will be apparent from a detailed description of the same which consists in the features of construction and combinations of parts hereinafter described and claimed.

Referring to the drawings:

Figure 1 shows a face view of a sheet having a number of illustrations thereon in conjunction with perforations or markings adapted to accommodate the words relating to the figures, the cards or blocks carrying the correct legends being inserted in said perforations or recesses, or located on the markings;

Fig. 2 shows a view similar to Fig. 1, with the exception that it illustrates a sheet having other pictures on its face, and other perforations or markings for the reception of cards or blocks carrying legends adapted to spell a simple phrase;

Figures 3, 4, 5:
Fig. 3 shows still another sheet provided with simple arithmetical problems and perforations or recesses or markings for receiving cards or blocks having the answers to the problems marked on their faces.
Fig. 4 shows a section taken on the line 4—4 of Fig. 3 looking in the direction of the arrows.
Fig. 5 shows in perspective one of the specially formed blocks or cards carrying a legend 4.

Referring to the arrangement shown in Fig. 1, the same comprises a sheet 6 having printed or carried on its face the illustrations or legends 7, 8, 9, and 10. These happen to be a cat, a dog, a pig, and a cow. Beneath or adjacent to each of these figures or legends, are a plurality of perforations or recesses or marked outlines 11, 12 and 13. It will be observed that these perforations or recesses or marked outlines are of special or peculiar formation or contour, one form or contour being conveniently reserved for each letter of the alphabet. That is to say, the form or contour and size of the perforation or recess or outline for the letter C is different from that for any other letter of the alphabet.

In conjunction with the sheet or page, or in conjunction with the book outfit or surface embodying the features of the invention, I provide a plurality of cards or blocks carrying the various characters or legends, which cards or blocks are cut into the different forms and sizes corresponding to their respective characters. For example, the cards carrying the letter C are all of proper shape to seat correctly into the perforations or recesses or into the outlines intended for their particular accommodation. A sufficient number of cards is provided for each character to enable the child to fill up the required number of recesses or marked outlines at one time.

Examination of the sheet shown in Fig. 1, shows the fact that all of the C's therein illustrated are of the same contour, and the same is also true of the O's and G's. This would likewise be true of the other letters represented in that figure.

Upon presenting the child with one or more sheets having the correct perforations or recesses or marked outlines and also the proper equipment of cards or blocks, it remains only for the child to select from the cards or blocks those which will correctly seat into their respective perforations or recesses or within their respective outlines. Upon seating them in this manner, the word will be correctly spelled out, because each card or block will only fit into a recess or perforation or outline intended for its reception.

In the form illustrated in Fig. 2, the various perforations or outlines are formed for the reception of cards or blocks spelling a simple sentence, which sentence is particularly applicable to the simple illustrations contained on that sheet.

In the arrangement shown in Fig. 3, a number of simple arithmetical problems are presented, illustrating the processes of addition, subtraction, division, and multiplication. In this embodiment of the invention, the various numerical characters 14, 15, and 16 may be stamped or impressed permanently on the sheet, a perforation or recess or outline 17 being provided for the accommodation of a particular card or block carrying that numeral which is the correct answer to the problem. A series of forms of perforation or recess or outlines is reserved for the various numbers from zero to 9 inclusive, so that it only remains for the child to select a card or block of the correct form to properly seat into the recess or perforation or outline in order to provide the correct answer to the problem.

The cards or blocks carrying the legends or characters are not necessarily physically associated or attached to the sheets with which they are to be used, but should ordinarily be supplied or provided in connection therewith. In those cases in which a number of sheets are brought together into the form of a book, the little blocks or cards may be conveniently carried in an envelop 18 mounted on one of the covers 19 of the book. However, I wish it to be distinctly understood that, as far as certain features of the invention are concerned, it is quite unnecessary to provide a physical association or connection of this kind, although the same is, in many cases, a matter of convenience.

I claim:

1. In a device of the class described, the combination of a surface carrying characters or legends, and having outlines adjacent to said characters or legends for the accommodation of cards or blocks, having on their exposed surface characters or legends referring to the characters or legends on the face of the sheet, and cards or blocks for said outlines, the perimeter of each card or block conforming to the overall perimeter of the character or legend thereon, and the perimeter of each card or block having a given legend on its face being the same as the perimeter of other blocks of the same legend but of no other blocks, and the perimeter of each outline being the same as that of the card or block intended to seat thereinto, for the purpose specified.

2. In a device of the class described, the combination of a surface having thereon characters or legends, and having adjacent to such characters or legends outlines for the accommodation of cards or blocks in reference thereto, each card or block having on its exposed face a character or legend referring to the character or legend on the surface aforesaid, each card or block having a perimeter conforming to the overall perimeter of the character appearing on its face, and the perimeters of all blocks having a common character or legend being the same, and the perimeter of each outline being the same as that of the card or block intended to seat thereinto, for the purpose specified.

RAYMOND H. GARMAN.